May 27, 1941.  E. J. COOK  2,243,194

MAKING GLASS SHEET OR PLATE

Filed Feb. 21, 1938

INVENTOR.
Everett J. Cook
BY
Barnes, Kisselle, Laughlin & Raisch
ATTORNEYS

Patented May 27, 1941

2,243,194

UNITED STATES PATENT OFFICE 2,243,194

MAKING GLASS SHEET OR PLATE

Everett J. Cook, Toledo, Ohio

Application February 21, 1938, Serial No. 191,595

11 Claims. (Cl. 49—17)

This invention relates to the making of glass in the form of sheets or plates such as may be used for glazing purposes in buildings, automobiles, or elsewhere.

In the making of the so-called plate glass, very large expensive equipment is needed to grind and polish the glass surfaces. This equipment is, in some instances, of exceedingly great length, requires the use of much power and tremendous quantities of water. The equipment is not only initially expensive but is expensive to maintain and operate.

The principal object of this invention is to provide improvements in the art of making plate or sheet glass by means of which the glass surfaces are given a highly polished lustrous finish. The method contemplated is not a complicated one from the standpoint of the mechanical or physical steps involved, and the method may be carried out by a relatively small, inexpensive and cheaply operated apparatus. Generally, the invention involves what may be termed steam polishing the glass surfaces, this being accomplished as the glass sheet moves from a supply of molten glass, and, contrary to the practice followed heretofore, as mentioned above, the treatment is given to the surfaces of the glass prior to complete solidification.

In the accompanying drawing, apparatus is shown somewhat diagrammatically for carrying out the invention, it being understood that the particular illustrations used are demonstrative only and that the invention is not limited to the particular structures, although these structures are specifically described below.

Figure 1:
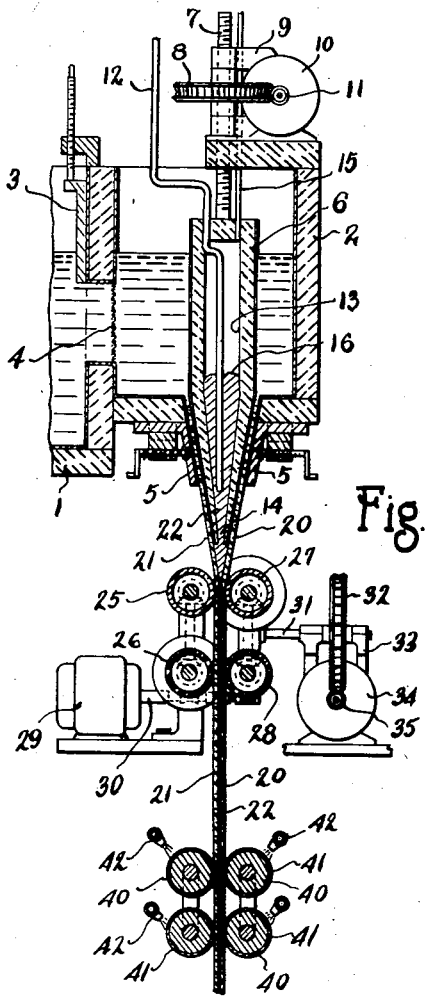
Fig. 1 is a view partly in cross section illustrating a receptacle and forebay for molten glass, an outlet for the glass, and means for treating a sheet of glass moved therefrom.

A glass furnace is generally illustrated at 1 provided with a forebay 2, which may be closed off by a suitable gate 3, and there may be a screen 4 between the body of the glass in the furnace and forebay. It will be understood that the glass furnace may be equipped with a number of forebays. The forebay is provided with an outlet or spout, the dimensions of which may be varied and controlled by adjustable members 5, and in the outlet is an element which may be termed an arbor 6, the lower end of which preferably is of tapering form to correspond to the outlet. This arbor may be arranged for vertical adjustment, and the means for accomplishing this, as shown herein, takes the form of a threaded shaft 7 upon which is a worm gear 8 having a threaded engagement therewith, the worm gear resting in a bracket 9 and for turning the worm gear is a motor 10 with a worm 11. The raising and lowering of the arbor and also adjustment of the pieces 5 varies the spacing between the outlet walls of the arbor for determining the thickness of the sheet of glass which issues therefrom.

As illustrated in Fig. 1, the forebay and arbor are adjusted for the issuance of two sheets of glass 20 and 21, together with an intermediate binder 22. This forms a so-called safety glass with the binder being united with the sheets to prevent the same from shattering. This binder may be introduced through one or more pipes 12 leading into the hollow interior 13 of the arbor, the hollow interior of the arbor opening at its lower end as illustrated at 14. The flow of the binder from the arbor may be determined by gaseous pressure transmitted into the interior of the arbor through a pipe 15 and this pressure may be above or below atmospheric to obtain the desired control. As illustrated, the substance is piled up, so to speak, inside the arbor, the upper surface being indicated at 16. This particular forebay and arbor construction has been selected for use in demonstrating the present invention, although it is to be understood that this invention may be used with other structures from which a sheet of glass may be caused to issue from a supply of molten glass.

The two sheets of glass with the intermediate binder are brought together, as shown in Fig. 1, between driven pressure rolls. There are two rolls 25 and 26 on one side of the composite sheet and two rolls 27 and 28 on the opposite side. These rolls may all be driven by a motor 29 which has a shaft 30 operably connected with the rollers as indicated. The set of rollers 27—28 may be adjusted toward and away from the rollers 25—26 to accommodate for variations in thickness of the composite sheet; this may be done by connecting the rollers 27 and 28 to a rod 31 arranged to be shifted by a worm gear 32 threaded on the shaft 31 and positioned in a bracket 33 and turned by a motor 34 having a worm 35 associated with the worm gear 32. Suitable automatic means may be used for operating the motors 19 and 34 in one direction or the other, depending upon which type of adjustment is needed, and these adjustments may be coordinated with each other. The construction involving the pressure rollers just described is also subject to variation.

The composite sheet moves with downward movement as illustrated in Fig. 1, and before the glass has completely solidified its surfaces are treated to give the surfaces a polished finish. In the several forms of this invention this is done by what may be termed a steam polishing process wherein a substance, which is preferably of a relatively fine soft texture, is brought into close proximity to the glass surfaces, with relative movement between the glass surfaces and the substance, and with the interposition of a gaseous film between the glass and the substance. This gaseous film is preferably steam, and the steam may be generated in situ by the presentation of water substantially where the glass surfaces and the said substance come into proximity with each other.

The substance is preferably one which will withstand the heat of the glass, and one such substance is carbon, preferably of a soft velvety nature, obtained by the burning of a cork composition or the like. Suitable means is provided for supporting this substance and for moving the substance, where movement other than that of the glass, is used. For example, in Fig. 1 there is a set of rollers generally indicated at 40 each is provided on its surface with a film of such carbon, the film being illustrated at 41. These rollers are preferably driven so as to produce the desired relative movement between the surfaces of the glass and the surfaces of the carbon substance, and the direction of rotation may be such that the surfaces adjacent the glass move in the direction of movement of the glass or in the reverse direction. Water may be supplied by spraying the same on to the surfaces of the rollers by means of spray jets 42.

The water is taken up or absorbed by the velvety-like film of carbon, and then when the surfaces come into proximity with the heated glass, steam is formed. The steam apparently actually prevents physical contact between the surfaces of the glass and the carbon film, although the steam film may be very thin, and the action is that of giving the surfaces of the glass a highly polished, lustrous finish without, however, resorting to an actual grinding or polishing operation. The speed of rotation of the rollers 40 and the direction of rotation may be adjusted to give the best results, with due regard to the rate of movement of the composite sheet.

Substances other than carbon may be used; preferably the substance is of a relatively soft nature and such that it has the capacity of carrying water into position to form the steam film. Such other substances may be made from properly composed ceramic materials which may have a sort of porous nature for carrying the water into position, or other materials which are found to be capable of withstanding the heat.

Figure 2:
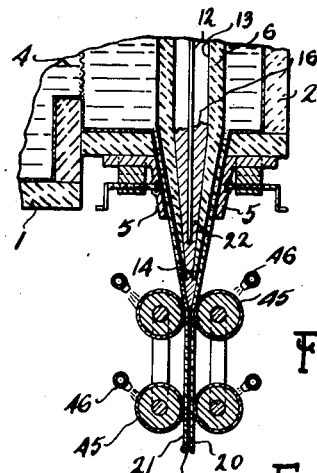
Fig. 2 is a view similar to Fig. 1 illustrating a modified form.

In Fig. 2 a modified arrangement is shown wherein the polishing rollers 45, which are similar to the rollers 40, are placed in proximity to the outlet of the bay. Water may be supplied from jets 46, and the compression rollers corresponding to the rollers 25 to 28, inclusive, are eliminated. In this form the polishing rollers serve to bring the glass sheets and the intermediate binder together. But the presence of the steam film gives the glass surfaces a polished, lustrous finish.

Figure 3:
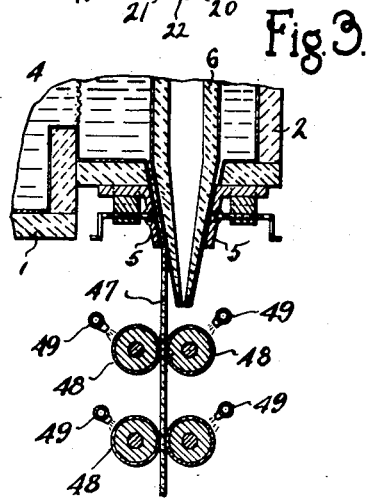
Fig. 3 is a view similar to Fig. 2 illustrating another modified form.

In Fig. 3 is shown an arrangement where a single sheet of glass 47 is produced, polishing rollers 48 being positioned in proximity to the outlet for the plastic glass. These rollers are kept moist by water from jets 49. In Fig. 3 the bay and arbor construction is the same as that shown in Figs. 1 and 2 but the adjustable features at the outlet are positioned so that the glass issues only along one side of the arbor. In other words the outlet opening is closed on the opposite side of the arbor. The construction illustrated is suitable for this purpose, although the polishing arrangement may be used with any other form of device for producing or issuing a sheet of glass.

Figure 4:
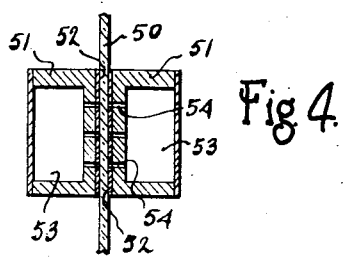
Fig. 4 is a view illustrating a further modified form of device for polishing a moving sheet of glass.
Figure 5:
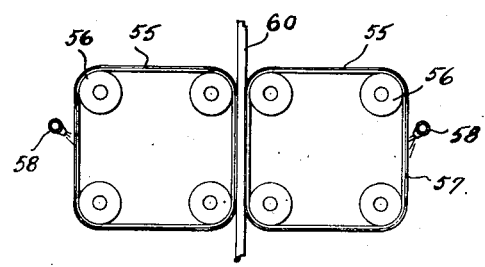
Fig. 5 is a view illustrating a still further modified form of device for polishing the surfaces of a moving sheet of glass.

In Fig. 4 a sheet of glass 50 moves between stationary blocks or support members 51 provided with facings 52 of a substance such as carbon which may be kept moist by water passing through chamber 53 and passageways 54. In Fig. 5 belts 55 running over rollers 56 are shown, the belts having a layer of substance 57, such as carbon, for glass polishing purposes and which may be kept moist by water issuing from jets 58. A glass 59 moves between two adjacent runs of the belts, and the rollers may be adjusted to vary the length of the effective run of the belts. This form also makes it feasible to change belts from time to time to replace the carbon substance.

In some of the claims appended hereto use is made of the word "polished" in describing the step of the method and function of the apparatus. This is not to be confused with a situation where there is an actual contact and abrading action; the term is used with the intention of covering the steam polishing or finishing as described herein.

I claim:
1. In the art of producing glass in sheet or plate form, the steps of causing glass in sheet or plate form to issue downwardly through a forming opening from a supply of molten glass with movement substantially in the plane of the sheet or plate, passing the sheet or plate with substantially straight line movement past and in close proximity to a wetted substance so that the heat from the glass generates steam to set up a steam film between surfaces of the sheet or plate and said substance prior to solidification of the glass, to prevent actual contact between the sheet and said substance and to give the surfaces of the glass a polished finish.

2. In the art of producing glass in sheet or plate form, the steps of causing glass in sheet or plate form to issue downwardly through a forming opening from a supply of molten glass with movement substantially in the plane of the sheet or plate, passing the sheet or plate with substantially straight line movement past and in close proximity to a soft carbon element in a wetted condition whereby the heat of the glass generates steam to set up a steam film between the carbon and the surfaces of the glass prior to solidification of the glass to prevent substantial contact and to give the surfaces a polished finish.

3. In the art of producing glass in sheet or plate form, the steps of causing glass in sheet or plate form to flow downwardly from a supply of molten glass through a restricting opening with movement substantially in the plane of the sheet or plate, passing the glass with straight line movement past and in close proximity to but out of actual contact with an element comprising soft carbon containing water whereby the heat from the glass generates steam to set up a steam film between the surfaces of the glass and the carbon element to give the surfaces a polished finish.

4. In the art of producing glass in sheet or plate form, the steps of causing glass in sheet or plate form to gravitate through a shape-defining opening from a supply of molten glass with movement substantially longitudinally, presenting to surfaces of the sheet or plate substantially without pressure a moving element comprising a heat resisting substance containing water whereby the heat from the glass generates steam to set up a steam film between the surfaces of the glass and said element to prevent substantial contact and to give the surfaces a polished finish.

5. An apparatus for making sheet or plate glass which comprises, a receptacle for molten glass, an outlet means adjacent the bottom of the receptacle for flowing of a stream of glass in a downward direction in the form of sheet or plate from the receptacle, means for guiding the sheet with straight line movement, and an absorbent element containing a liquid positioned in close proximity to the sheet at a point where the glass is plastic but out of direct contact therewith for the generation of steam by the heat of the glass, whereby a film of steam is set up between the surfaces of the glass and said element for giving the surfaces a polished finish.

6. An apparatus for making sheet or plate glass which comprises, a receptacle for molten glass having an outlet opening in its bottom with dimensions substantially corresponding to the sheet or plate, for the flowing of molten glass downwardly therethrough in plate or sheet form, means having a surface of a soft carbon positioned for the passage of the plate or sheet of glass past the same with straight line movement and in proximity thereto but out of direct contact therewith and while the glass is plastic, and means for wetting the carbon, whereby the heat of the glass generates steam so that a film of steam is set up between the glass surfaces and the carbon to give the glass surfaces a polished finish.

7. An apparatus for making sheet or plate glass which comprises, a receptacle for molten glass having an outlet opening in its bottom with dimensions substantially corresponding to the sheet or plate, for the flowing of molten glass downwardly therethrough in plate or sheet form, means having a surface of a soft carbon positioned for the passage of the plate or sheet of glass past the same with straight line movement and in proximity thereto but out of direct contact therewith and while the glass is plastic, means for wetting the carbon whereby the heat of the glass generates steam so that a film of steam is set up between the glass surfaces and the carbon to give the glass surfaces a polished finish, and means for moving the first mentioned means to produce relative movement between the carbon and the glass other than that caused by the movement of the sheet or plate of glass.

8. An apparatus for making sheet or plate glass which comprises, means for issuing glass in the form of sheet or plate from a supply of molten glass with movement longitudinally in a straight line, and a set of driven rollers having soft carbon surfaces positioned on opposite sides of the sheet or plate and located to lie in proximity to the sheet or plate but out of direct contact therewith while the glass is plastic, and means for wetting the carbon for the generation of steam by the heat of the glass to set up a film of steam between the glass and the surfaces of the rollers.

9. An apparatus for making sheet or plate glass which comprises, means for issuing glass in the form of sheet or plate from a supply of molten glass with movement longitudinally, an endless belt operating over rollers having a surface of soft carbon, said belt being positioned so that a run thereof lies in proximity to but out of contact with surfaces of the sheet or plate while the glass is plastic, and means for wetting the carbon surface of the belt for the generation of a film of steam due to the heat of the glass between the glass surfaces and the carbon film for steam polishing the surfaces of the glass.

10. An apparatus for making sheet or plate glass which comprises, means for issuing glass in the form of sheet or plate from a supply of molten glass with movement substantially longitudinally, and a stationary element having a surface of relatively soft carbon positioned in proximity to but out of direct contact with surfaces of the sheet or plate while the glass is plastic, and means for wetting the carbon for the generation of a film of steam by the heat of the glass between the surfaces of the sheet or plate and the surfaces of carbon for steam polishing the surfaces of the glass.

11. In the art of producing glass in sheet or plate form, the steps of causing molten glass in sheet or plate form to issue from a supply of molten glass with movement longitudinally, passing the sheet or plate while in a plastic condition with a substantially straight line movement in proximity to a moving element of heat resisting absorbent substance moistened with a liquid and which liquid vaporizes to set up a vapor film between the surfaces of the glass to prevent substantial contact between the surfaces of the glass and said element and to give the surfaces of the glass a polished finish.

EVERETT J. COOK.